March 30, 1926. 1,578,915

L. M. PERKINS

GENERATOR

Filed June 1, 1922

INVENTOR
L. M. Perkins
BY
Denison Thompson
ATTORNEYS

Patented Mar. 30, 1926.

1,578,915

UNITED STATES PATENT OFFICE.

LAURENCE M. PERKINS, OF SYRACUSE, NEW YORK, ASSIGNOR OF ONE-HALF TO OWEN-DYNETO CORPORATION, OF SYRACUSE, NEW YORK, A CORPORATION OF NEW YORK.

GENERATOR.

Application filed June 1, 1922. Serial No. 565,038.

*To all whom it may concern:*

Be it known that I, LAURENCE M. PERKINS, a citizen of the United States of America, of Syracuse, in the county of Onondaga, in the State of New York, have invented new and useful Improvements in Generators, of which the following, taken in connection with the accompanying drawings, is a full, clear, and exact description.

This invention relates to certain improvements in generators, and contemplates certain improvements on my co-pending applications, Serial Nos. 418,181 and 555,335.

The main object of the invention is to produce a more efficient and readily controllable regulation of the field current of the generator, this regulation being effected either by the utilization of an external regulator or by the combination of such an external regulator with the inherent regulation characteristic of a third brush machine.

Other objects and advantages will appear from the following description, taken in connection with the accompanying drawings, in which:—

Figure 1:
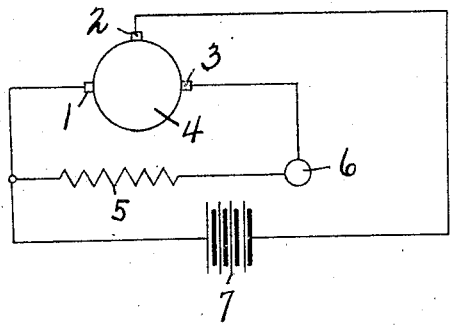

Figure 1 diagrammatically illustrates a generator of my invention.

Figure 2:
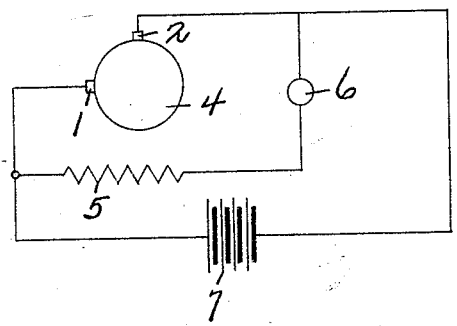

Figure 2 diagrammatically illustrates a modified form of generator.

As shown in Figure 1, the generator comprises an armature —4— provided with main brushes —1— and —2—, and a third brush —3—. The main brush —1— is set practically on neutral, while the main brush —2— is off its neutral point in the direction of rotation to such an extent that the angle between the two main brushes is less than 180 electrical degrees, and altho shown as approximately 90 electrical degrees from the brush —1—, yet the brush —2— may be in any position in the field form so that the angle between the two brushes is less than 180 electrical degrees and preferably less than 150 electrical degrees, and more than 60 electrical degrees.

The angular disposition of main brush —2— is determined somewhat by the generator design and the desired output. The third brush —3— is placed at or near the other neutral point opposite the main brush —1—.

It will be noted that the brush —2— in this construction of machine may be placed in such a position in the field form that the field density at that point is relatively low instead of being placed in the position of maximum field density as is the case with this main brush in the normal third brush machine.

The generator further comprises a field winding —5— connected in shunt across the main brush —1— and the third brush —3—. This construction and arrangement has that inherent regulation characteristic of a third brush machine, and in addition in the shunt field circuit between the main brush —1— and the third brush —3—, I have placed a field current regulator —6— which may be of any suitable or desired form or construction, as for instance, the known regulator having vibrating contacts or the known carbon pile rheostat actuated either by voltage or current. However, any suitable regulator may be provided for effecting this result that I term external regulation.

The machine of Figure 2 lacks that inherent regulation characteristic of a third brush machine and the shunt field is connected directly across the main brushes —1— and —2—, which main brushes may be set in substantially the same position as indicated in Figure 1, and in this shunt field circuit is placed a regulator —6—, and as before stated, may be the carbon pile rheostat or a regulator embodying vibrating contacts, or other satisfactory device.

In both structures, the main brushes —1— and —2— are connected in circuit across a source of potential, as the battery —7—.

Regulators of the type described and suitable for incorporation in the shunt field circuit of my generator are so well known that it is unnecessary to herein further illustrate or describe any particular regulator, and any of the known field current regulators may be inserted in the said circuit for effecting what is termed external regulation, and I do not, therefore, desire to limit myself to the details of form, construction or arrangement of the regulator or to the details of form, construction or arrangement of the other portions of the devices disclosed, as various changes and modifications may be made without departing from the invention as set forth in the appended claims.

I claim:

1. The combination with a variable speed generator having a brush substantially on neutral and a brush off its neutral to such an extent that the angle between the two brushes is less than 180 electrical degrees, and an external source of E. M. F. connected to the two before mentioned brushes, of a shunt field circuit, and a device in said circuit for regulating the field current.

2. The combination with a variable speed generator having a brush substantially on neutral, a brush off its neutral to such an extent that the angle between the two brushes is less than 180 electrical degrees, and an external source of E. M. F. connected to the two before mentioned brushes, of a shunt field circuit, and an automatic mechanism in said circuit for regulating the field current.

3. The combination with a variable speed generator having a brush substantially on neutral, a brush off its neutral to such an extent that the angle between the two brushes is less than 180 electrical degrees, and an external source of E. M. F. connected to said two brushes, of a third brush substantially on the other neutral point, a shunt field connected across the two brushes on the neutral points, and a regulating device in the shunt field.

4. The combination with a variable speed generator having a brush substantially on neutral, a brush off its neutral in the direction of rotation to such an extent that the angle between said two brushes is less than 180 electrical degrees, and an external source of E. M. F. connected to said two brushes, of a third brush substantially on the other neutral point, a shunt field circuit connected across the two brushes on the neutral points, and automatic mechanism in said shunt field circuit for regulating the field current.

In witness whereof I have hereunto set my hand this 22 day of May 1922.

LAURENCE M. PERKINS.